United States Patent
Basovskiy et al.

(10) Patent No.: US 11,411,976 B2
(45) Date of Patent: Aug. 9, 2022

(54) RESOURCE-EFFICIENT GENERATION OF ANALYTICAL ATTACK GRAPHS

(71) Applicant: Accenture Global Solutions Limited, Dublin (IE)

(72) Inventors: Alexander Basovskiy, Hod Hasharon (IL); Dmitry Kravchenko, Kefar Sava (IL); Avraham Dayan, Bnei Brak (IL); Moshe Hadad, Rosh HaAyim (IL)

(73) Assignee: Accenture Global Solutions Limited, Dublin (IE)

(*) Notice: Subject to any disclaimer, the term of this patent is extended or adjusted under 35 U.S.C. 154(b) by 278 days.

(21) Appl. No.: 16/924,483

(22) Filed: Jul. 9, 2020

(65) Prior Publication Data
US 2022/0014534 A1    Jan. 13, 2022

(51) Int. Cl.
  *H04L 29/06* (2006.01)
  *H04L 9/40* (2022.01)
  *G06F 16/22* (2019.01)

(52) U.S. Cl.
  CPC ...... *H04L 63/1425* (2013.01); *G06F 16/2255* (2019.01)

(58) Field of Classification Search
  CPC ............ H04L 63/1425; H04L 63/1433; G06F 16/2255; G06F 21/577; G06N 5/04
  See application file for complete search history.

(56) References Cited

U.S. PATENT DOCUMENTS

| | | |
|---|---|---|
| 5,521,910 A | 5/1996 | Matthews |
| 6,279,113 B1 | 8/2001 | Vaidya |
| 6,487,666 B1 | 11/2002 | Shanklin et al. |
| 7,540,025 B2 | 5/2009 | Tzadikario |

(Continued)

FOREIGN PATENT DOCUMENTS

| | | |
|---|---|---|
| EP | 1559008 | 8/2005 |
| EP | 1768043 | 3/2007 |

(Continued)

OTHER PUBLICATIONS

Purvine, Emilie, John R. Johnson, and Chaomei Lo. "A graph-based impact metric for mitigating lateral movement cyber attacks." Proceedings of the 2016 ACM Workshop on Automated Decision Making for Active Cyber Defense. 2016. (Year: 2016).*

(Continued)

*Primary Examiner* — Joseph P Hirl
*Assistant Examiner* — Ka Shan Choy
(74) *Attorney, Agent, or Firm* — Fish & Richardson P.C.

(57) ABSTRACT

Implementations include evaluating a first sub-set of rules based on a first sub-set of facts to provide a first set of impacts, evaluating including applying the first sub-set of facts to each rule using a hash join operation to determine whether a rule results in an impact, indexes of arguments of facts being used in a probe phase of the hash join operation, evaluating a second sub-set of rules using impacts of the first set of impacts to provide a second set of impacts, determining whether each goal in a set of goals has been achieved using the first set of impacts and the second set of impacts, each goal being provided as an impact, in response to determining that each goal in the set of goals has been achieved, removing paths of the AAG, each of the paths resulting in an impact that is not a goal.

24 Claims, 6 Drawing Sheets

(56) References Cited

U.S. PATENT DOCUMENTS

| | | | |
|---|---|---|---|
| 7,703,138 B2 | 4/2010 | Desai et al. | |
| 7,904,962 B1* | 3/2011 | Jajodia | H04L 63/1425 |
| | | | 709/224 |
| 8,099,760 B2 | 1/2012 | Cohen et al. | |
| 8,176,561 B1 | 5/2012 | Hurst et al. | |
| 8,656,493 B2 | 2/2014 | Capalik | |
| 9,256,739 B1 | 2/2016 | Roundy et al. | |
| 9,563,771 B2 | 2/2017 | Lang et al. | |
| 9,633,306 B2 | 4/2017 | Liu et al. | |
| 10,084,804 B2 | 9/2018 | Kapadia et al. | |
| 10,291,645 B1 | 5/2019 | Frantzen et al. | |
| 10,447,721 B2 | 10/2019 | Lasser | |
| 10,447,727 B1 | 10/2019 | Hecht | |
| 10,642,840 B1* | 5/2020 | Attaluri | G06F 16/335 |
| 10,659,488 B1 | 5/2020 | Rajasooriya et al. | |
| 10,771,492 B2 | 9/2020 | Hudis et al. | |
| 10,848,515 B1 | 11/2020 | Pokhrel et al. | |
| 10,868,825 B1* | 12/2020 | Dominessy | H04L 63/1433 |
| 10,873,533 B1 | 12/2020 | Ismailsheriff et al. | |
| 10,956,566 B2 | 3/2021 | Shu et al. | |
| 10,958,667 B1 | 3/2021 | Maida et al. | |
| 11,089,040 B2 | 8/2021 | Jang et al. | |
| 11,159,555 B2 | 10/2021 | Hadar et al. | |
| 11,184,385 B2 | 11/2021 | Hadar et al. | |
| 11,232,235 B2 | 1/2022 | Hadar et al. | |
| 11,277,431 B2 | 3/2022 | Hassanzadeh et al. | |
| 11,281,806 B2 | 3/2022 | Hadar et al. | |
| 11,283,825 B2 | 3/2022 | Grabois et al. | |
| 2005/0193430 A1 | 9/2005 | Cohen et al. | |
| 2006/0037077 A1 | 2/2006 | Gadde et al. | |
| 2008/0044018 A1 | 2/2008 | Scrimsher et al. | |
| 2008/0301765 A1 | 12/2008 | Nicol et al. | |
| 2009/0077666 A1 | 3/2009 | Chen et al. | |
| 2009/0307772 A1 | 12/2009 | Markham et al. | |
| 2009/0319248 A1 | 12/2009 | White et al. | |
| 2010/0058456 A1 | 3/2010 | Jajodia et al. | |
| 2010/0138925 A1 | 7/2010 | Barai et al. | |
| 2010/0174670 A1 | 7/2010 | Malik et al. | |
| 2011/0035803 A1 | 2/2011 | Lucangeli Obes et al. | |
| 2011/0093916 A1 | 4/2011 | Lang et al. | |
| 2011/0093956 A1 | 4/2011 | Laarakkers et al. | |
| 2013/0097125 A1 | 4/2013 | Marvasti et al. | |
| 2013/0219503 A1 | 8/2013 | Amnon et al. | |
| 2014/0082738 A1 | 3/2014 | Bahl | |
| 2014/0173740 A1* | 6/2014 | Albanese | G06F 21/577 |
| | | | 726/25 |
| 2015/0047026 A1 | 2/2015 | Neil et al. | |
| 2015/0106867 A1 | 4/2015 | Liang | |
| 2015/0199207 A1 | 7/2015 | Lin et al. | |
| 2015/0261958 A1 | 9/2015 | Hale et al. | |
| 2015/0326601 A1 | 11/2015 | Grondin et al. | |
| 2016/0205122 A1 | 7/2016 | Bassett | |
| 2016/0277423 A1 | 9/2016 | Apostolescu et al. | |
| 2016/0301704 A1 | 10/2016 | Hassanzadeh et al. | |
| 2016/0301709 A1 | 10/2016 | Hassanzadeh et al. | |
| 2017/0012836 A1 | 1/2017 | Tongaonkar et al. | |
| 2017/0032130 A1 | 2/2017 | Joseph et al. | |
| 2017/0041334 A1 | 2/2017 | Kahn et al. | |
| 2017/0085595 A1 | 3/2017 | Ng et al. | |
| 2017/0163506 A1 | 6/2017 | Keller | |
| 2017/0230410 A1 | 8/2017 | Hassanzadeh et al. | |
| 2017/0318050 A1 | 11/2017 | Hassanzadeh et al. | |
| 2017/0324768 A1 | 11/2017 | Crabtree et al. | |
| 2017/0364702 A1 | 12/2017 | Goldfarb et al. | |
| 2017/0366416 A1 | 12/2017 | Beecham et al. | |
| 2018/0013771 A1 | 1/2018 | Crabtree et al. | |
| 2018/0103052 A1 | 4/2018 | Choudhury et al. | |
| 2018/0152468 A1 | 5/2018 | Nor et al. | |
| 2018/0183827 A1 | 6/2018 | Zorlular et al. | |
| 2018/0255077 A1 | 9/2018 | Paine | |
| 2018/0255080 A1 | 9/2018 | Paine | |
| 2018/0295154 A1 | 10/2018 | Crabtree et al. | |
| 2018/0367548 A1 | 12/2018 | Stokes, III et al. | |
| 2019/0052663 A1 | 2/2019 | Lee et al. | |
| 2019/0052664 A1 | 2/2019 | Kibler et al. | |
| 2019/0141058 A1 | 5/2019 | Hassanzadeh et al. | |
| 2019/0182119 A1 | 6/2019 | Ratkovic et al. | |
| 2019/0188389 A1 | 6/2019 | Peled et al. | |
| 2019/0312898 A1 | 10/2019 | Verma et al. | |
| 2019/0373005 A1 | 12/2019 | Bassett | |
| 2020/0014265 A1 | 1/2020 | Whebe Spiridon | |
| 2020/0014718 A1* | 1/2020 | Joseph Durairaj | G06F 21/554 |
| 2020/0042712 A1 | 2/2020 | Foo et al. | |
| 2020/0045069 A1 | 2/2020 | Nanda et al. | |
| 2020/0099704 A1 | 3/2020 | Lee et al. | |
| 2020/0112487 A1 | 4/2020 | Inamdar et al. | |
| 2020/0128047 A1 | 4/2020 | Biswas et al. | |
| 2020/0137104 A1 | 4/2020 | Hassanzadeh et al. | |
| 2020/0175175 A1 | 6/2020 | Hadar et al. | |
| 2020/0177615 A1 | 6/2020 | Grabois et al. | |
| 2020/0177616 A1 | 6/2020 | Hadar et al. | |
| 2020/0177617 A1 | 6/2020 | Hadar et al. | |
| 2020/0177618 A1 | 6/2020 | Hassanzadeh et al. | |
| 2020/0177619 A1 | 6/2020 | Hadar et al. | |
| 2020/0296137 A1 | 9/2020 | Crabtree et al. | |
| 2020/0358804 A1 | 11/2020 | Crabtree et al. | |
| 2021/0006582 A1 | 1/2021 | Yamada et al. | |
| 2021/0168175 A1 | 6/2021 | Crabtree et al. | |
| 2021/0173711 A1 | 6/2021 | Crabtree et al. | |
| 2021/0248443 A1 | 8/2021 | Shu et al. | |
| 2021/0273978 A1 | 9/2021 | Hadar et al. | |
| 2021/0409426 A1 | 12/2021 | Engelberg et al. | |
| 2021/0409439 A1 | 12/2021 | Engelberg et al. | |
| 2022/0014445 A1 | 1/2022 | Engelberg et al. | |
| 2022/0021698 A1 | 1/2022 | Hadar et al. | |
| 2022/0038491 A1 | 2/2022 | Hadar et al. | |
| 2022/0051111 A1 | 2/2022 | Hadar et al. | |
| 2022/0070202 A1 | 3/2022 | Busany et al. | |
| 2022/0124115 A1 | 4/2022 | Grabois et al. | |
| 2022/0129590 A1 | 4/2022 | Hadar et al. | |
| 2022/0131894 A1 | 4/2022 | Hassanzadeh et al. | |
| 2022/0150270 A1 | 5/2022 | Klein et al. | |

FOREIGN PATENT DOCUMENTS

| | | |
|---|---|---|
| EP | 2385676 | 11/2011 |
| EP | 2816773 | 12/2014 |

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

EP Search Report in European Application. No. 21159421.3, dated Jun. 30, 2021, 11 pages.

Foundations of Databases, 1st ed., Abiteboul et al. (eds.), 1995, Chapter 12, 38 pages.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

Hansen et al., "Model-in-the-Loop and Software-in-the-Loop Testing of Closed-Loop Automotive Software with Arttest," Informatik, 2017, 13 pages.

Hofner et al., "Dijkstra, Floyd and Warshall meet Kleene," Formal Aspects of Computing, Jul. 2012, 24(4-6):459-476.

(56) References Cited

OTHER PUBLICATIONS

Idika et al., "Extending attack graph-based security metrics and aggregating their application," IEEE Transactions on Dependable and Secure Computing, Jan./Feb. 2012, 9(1):75-85.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Ingols et al., "Practical Attack Graph Generation for Network Defense," 2006 22nd Annual Computer Security Applications Conference (ACSAC'06), Miami Beach, Florida, Dec. 11-15, 2006, 10 pages.

Li et al., "Cluster security research involving the modeling of network exploitations using exploitation graphs," Proceedings of the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Phillips et al., "A graph-based system for network-vulnerability analysis," Proceedings of the 1998 Workshop on New Security Paradigms, Charlottesville, Virginia, Sep. 22-26, 1998, 71-79.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html, retrieved on Jul. 9, 2021, retrieved from URL<https://new.siemens.com/global/en/markets/automotive-manufacturing/digital-twin-product.html>, 11 pages.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Stanek et al., "Method of comparing graph differencing algorithms for software differencing," 2008 IEEE International Conference on Electro/Information Technology, Ames, Iowa, May 18-20, 2008, 482-487.

Swiler et al., "A graph-based network-vulnerability analysis system," Sandia National Laboratories, 1997, Tech. Rep. SAND97-3010/1, 25 pages.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

Vehicle Power Management, 1st ed., Zhang et al (eds.), Aug. 2011, Chapter 10, 27 pages.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Yi et al., "Overview on attack graph generation and visualization technology," 2013 International Conference on Anti-Counterfeiting, Security and Identification (ASID), Shanghai, China, Oct. 25-27, 2013, 6 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhao et al., "Attack graph analysis method for large scale network security hardening," J. Front. Comput. Sci. Technology, 2018, 12(2):263-273 (with English Abstract).

Narmeen Zakaria Bawany; DDoS Attack Detection and Mitigation Using SDN: Methods, Practices, and Solutions; Springer-2017; p. 425-441.

Alvarenga et al., "Discovering Attack Strategies Using Process Mining," Presented at Proceedings of the Eleventh Advanced International Conference on Telecommunications, Brussels. Belgium, Jun. 21-26, 2015, 119-125.

Chen et al., "Distributed Attack Modeling Approach Based on Process Mining and Graph Segmentation," Entropy, Sep. 2020, 22(9):1026, 21 pages.

Coltellese et al., "Triage of IoT Attacks Through Process Mining," Presented at Proceedings of on the Move to Meaningful Internet Systems Conference 2019, Rhodes, Greece, Oct. 21-25, 2019; Lecture Notes in Computer Science, Oct. 2019, 11877:326-344.

IEEE, "IEEE Standard for eXtensible Event Stream (XES) for Achieving Interoperability in Event Logs and Event Stream," IEEE Std 1849™_2016, Sep. 22, 2016, 50 pages.

Murata, "Petri Nets: Properties, Analysis and Applications," Proceedings of the IEEE, Apr. 1989, 77(4):541-580.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K-Shortest Paths," available on or before Aug. 6, 2020 via Internet Archive: Wayback Machine URL<https://web.archive.org/web/20200806185626/https://neo4j.com/does/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit. fraunhofer.

(56) References Cited

OTHER PUBLICATIONS de/documentation#discovery>, retrieved on Jul. 28, 2021, retrieved from URL<https://pm4py.fit.fraunhofer.de/documentation#discovery>, 5 pages.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Q. Liu et al., "Latte: Large-Scale Lateral Movement Detection," MILCOM 2018—2018 IEEE Military Communications Conference (MILCOM), 2018, pp. 1-6. doi: 10.1 109/MILCOM.2018.8599748. (Year: 2018).

X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).

EP Extended Search Report in European Appln. No. 21191752.1, dated Jan. 4, 2022, 8 pages.

Abraham et al., "Cyber Security Analytics: A Stochastic Model for Security Quantification Using Absorbing Markov Chains," Journal of Communications, Dec. 2014, 9(12):899-907.

Atoum et al., "A holistic cyber security implementation framework," Information Management & Computer Security, Jul. 2014, 22(3):251-264.

Fielder et al., "Decision support approaches for cyber security investment," Decision Support Systems, Jun. 2016, 86:13-23.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hasan et al., "Towards Optimal Cyber Defense Remediation in Energy Delivery Systems", Proceedings of 2019 IEEE Global Conununications Conference, Dec. 9-13, 2019, Waikoloa, Hawaii, 7 pages.

Husák et al., "Survey of Attack Projection, Prediction, and Forecasting in Cyber Security," IEEE Communications Surveys & Tutorials, Sep. 24, 2018, 21(1):640-660.

International Organization for Standardization, "International Standard: ISO/IEC 27001," ISO/IEC 27001:2013(E), Oct. 1, 2013, 29 pages.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Khouzani et al., "Scalable min-max multi-objective cyber-security optimization over probabilistic attack graphs", European Journal of Operational Research, Nov. 1, 2019, 278(3):894-903.

Schatz et al., "Economic valuation for information security investment: a systematic literature review," Information Systems Frontiers, Apr. 18, 2016, 19:1205-1228.

Shanddya et al., "Use of Attack Graphs in Security Systems", Hindawi Journal of Computer Networks and Communications, Oct. 20, 2014, 2014:818957, 14 pages.

Strom et al., "MITRE ATT&CK™: Design and Philosophy", The MITRE Corporation, Jul. 2018, 37 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wildpedia.org [online], "Traffic flow," last updated Oct. 19, 2020, retrieved on Oct. 26, 2020, retrieved from URL <https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

You et al., "A Review of Cyber Security Controls from an ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Optimal Decision-Making Approach for Cyber Security Defense Using Game Theory and Intelligent Learning," Security and Communication Networks, Dec. 23, 2019, 2019:3038586, 17 pages.

Borgatti et al., "A Graph-theoretic perspective on centrality," Social Networks, Oct. 2006, 28(4):466-484.

EP Search Report in European Application. No. EP20185251, dated Oct. 21, 2020, 7 pages.

Wang et al., "A Network Vulnerability Assessment Method Based on Attack Graph," 2018 IEEE 4th International Conference on Computer and Communications, Dec. 7-10, 2018, Chengdu, China, 1149-1154.

Barik et al., "Attack Graph Generation and Analysis Techniques," Defence Science Journal, Nov. 2016, 66(6):559-567.

Barrèère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology Mar. 1987, 92(5):1170-1182.

Cohen-Addad et al., "Hierarchical Clustering: Objective Functions and Algorithms," Journal of the ACM, Jun. 2019, 66(4):26, 42 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

Fundamentals of Bus iness Process Management, 2nd ed., Dumas et al. (eds.), 1998, 546 pages.

Hadar et al., "Big Data Analytics on Cyber Attack Graphs for Prioritizing Agile Security Requirements", Proceedings of the 2019

(56) References Cited

OTHER PUBLICATIONS

IEEE 27th International Requirements Engineering Conference, Sep. 23-27, 2019, Jeju Island, Kora, 330-339.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
National Institute of Standards and Technology [online], "National Vulnerability Database," last updated Jun. 2, 2020, retrieved on Jun. 3, 2020, retrieved from URL<https://nvd.nist.gov/>, 4 pages.
Networks: An Introduction, Newman (ed.), May 2010, 789 pages.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Process Mining, 1st ed., van der Aalst, 2011, Chapters 5-6, 63 pages.
Purvine et al., "A Graph-Based Impact Metric for Mitigating Lateral Movement Cyber Attacks", Automated Descision Making for Active Cyber Defence, Oct. 2016, pp. 45-52.
Sourceforge.net [online], "XSB," last updated Oct. 29, 2017, retrieved on Jun. 3, 2020, retrieved from URL <http://xsb.sourceforge.net/>, 2 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Wang et al., "Exploring Attack Graph for Cost-benefit Security Hardening: A Probabilistic Approach," Computers & Security, Feb. 2013, 32:158-169.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16. 2019, retrieved on Jun. 3, 2020, retrieved from URL <https://en.wikipedia.org/wiki/Backward_chaining>, 3 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 3030, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.

* cited by examiner

RESOURCE-EFFICIENT GENERATION OF ANALYTICAL ATTACK GRAPHS

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In an effort to defend against cyber-attacks, so-called analytical attack graphs (AAGs) can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

However, computer networks can be relatively large and generating one or more AAGs representative of a computer network is a resource-intensive task. For example, at least some traditional approaches in generating AAGs require a significant memory footprint and a significant amount of processing power (CPU cycles) to generate an AAG. In some instances, the required memory footprint can become so large that the generation process crashes as memory capacity is exceeded. Further, traditional approaches can require a significant amount of time to output an AAG, in some cases, tens of hours, for example. In some instances, traditional approaches provide an overly complex AAG that is difficult to use in cyber-security analysis.

SUMMARY

Implementations of the present disclosure are directed to analytical attack graphs (AAGs) for enterprise-wide cyber-security. More particularly, implementations of the present disclosure are directed to resource-efficient generation of AAGs. In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include evaluating a first sub-set of rules based on a first sub-set of facts to provide a first set of impacts, evaluating including applying one or more facts of the first sub-set of facts to each rule using a hash join operation to determine whether a rule results in an impact, indexes of arguments of facts being used in a probe phase of the hash join operation, evaluating a second sub-set of rules at least partially based on one or more impacts of the first set of impacts to provide a second set of impacts, determining whether each goal in a set of goals has been achieved at least partially based on the first set of impacts and the second set of impacts, each goal being provided as an impact, in response to determining that each goal in the set of goals has been achieved, removing one or more paths of the AAG, each of the one or more paths resulting in an impact that is not a goal in the set of goals, and storing the AAG to computer-readable memory. Other implementations of this aspect include corresponding systems, apparatus, and computer programs, configured to perform the actions of the methods, encoded on computer storage devices.

These and other implementations can each optionally include one or more of the following features: each index is provided as an integer that uniquely represents at least one argument of a respective fact; actions further include evaluating a third sub-set of rules at least partially based on one or more impacts of the second set of impacts to provide a third set of impacts; the one or more impacts of the second set of impacts is absent an impact that is determined to be a goal in the set of goals; evaluating the third sub-set of rules is executed in response to determining that each goal in the set of goals has not been achieved based on the first set of impacts and the second set of impacts; each rule includes a clause, each fact is provided as an argument to evaluate whether the clause is grounded, and at least one impact is provided as an argument to evaluate whether the clause is grounded; the first sub-set of rules only includes rules having facts as arguments; and the second sub-set of rules includes rules having impacts as arguments.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DESCRIPTION OF DRAWINGS

Like reference symbols in the various drawings indicate like elements.

DETAILED DESCRIPTION

Figure 1:
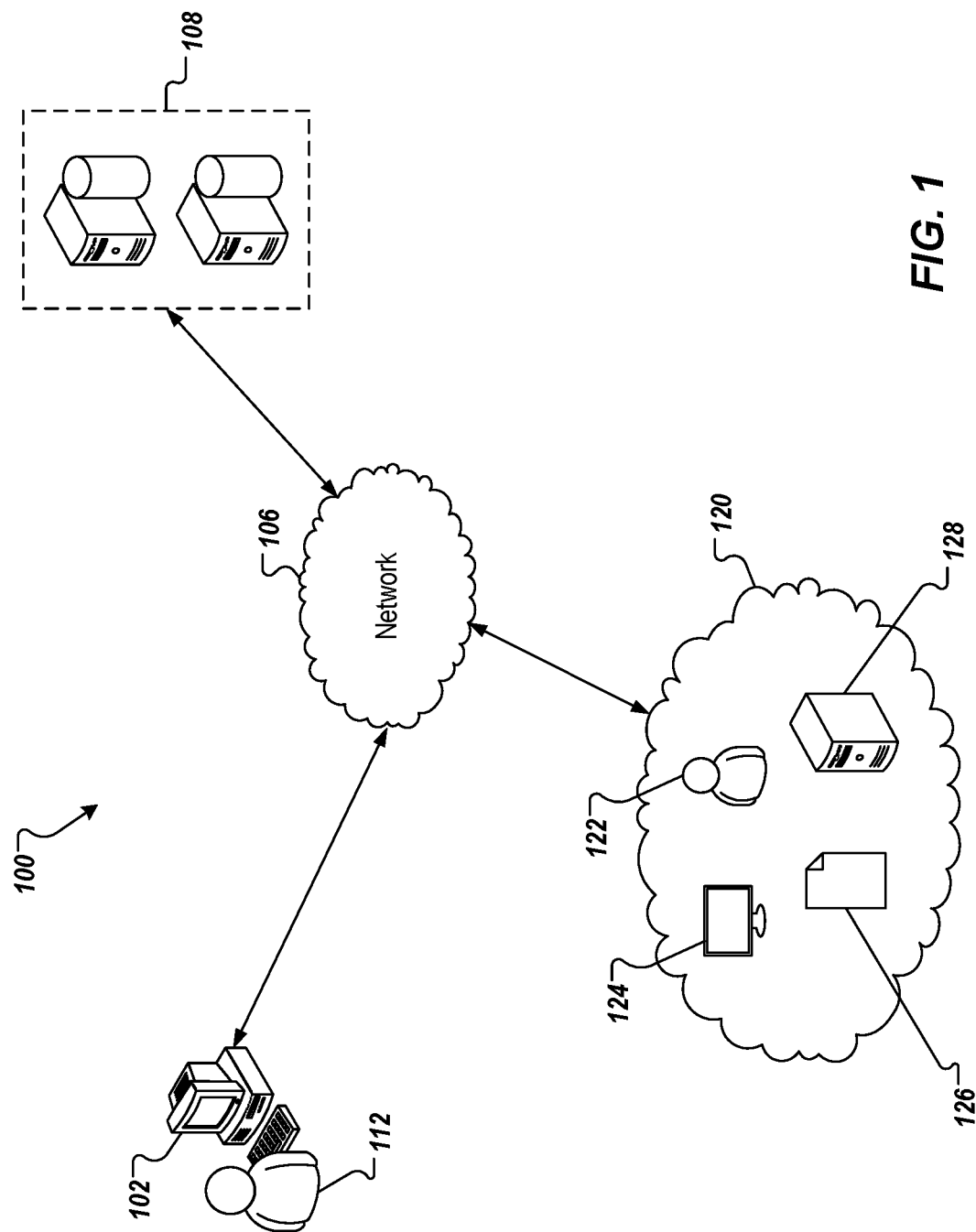
FIG. 1 depicts an example architecture that can be used to execute implementations of the present disclosure.

Implementations of the present disclosure are directed to analytical attack graphs (AAGs) for enterprise-wide cyber-security. More particularly, implementations of the present disclosure are directed to resource-efficient generation of AAGs. In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include evaluating a first sub-set of rules based on a first sub-set of facts to provide a first set of impacts, evaluating including applying one or more facts of the first sub-set of facts to each rule using a hash join operation to determine whether a rule results in an impact, indexes of arguments of facts being used in a probe phase of the hash join operation, evaluating a second sub-set of rules at least partially based on one or more impacts of the first set of impacts to provide a second set of impacts, determining whether each goal in a set of goals has been achieved at least partially based on the first set of impacts and the second set of impacts, each goal being provided as an impact, in response to determining that each goal in the set of goals has been achieved, removing one or more paths of the AAG, each of the one or more paths resulting in an impact that is not a goal in the set of goals, and storing the AAG to computer-readable memory.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINFs have been intentionally targeted intentionally and have suffered from significant losses when successfully exploited.

In general, attacks on CINFs occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In an effort to defend against cyber-attacks, AAGs can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

However, computer networks can be relatively large and generating one or more AAGs representative of a computer network is a resource-intensive task. For example, at least some traditional approaches in generating AAGs require a significant memory footprint and a significant amount of processing power (CPU cycles) to generate an AAG. In some instances, the required memory footprint can become so large that the generation process crashes as memory capacity is exceeded. Further, traditional approaches can require a significant amount of time to output an AAG, in some cases, tens of hours, for example. In some instances, traditional approaches provide an overly complex AAG that is difficult to use in cyber-security analysis.

In view of the above context, implementations of the present disclosure are directed to resource-efficient generation of AAGs. More particularly, implementations of the present disclosure process facts and rules to generate impacts based on a modified hash join approach, which uses indexes instead of hash values. In some implementations, multiple iterations are performed until all goals in a set of goals is achieved, where each goal is provided as an impact that is generated based on one or more facts and/or impacts applied to a rule. In some implementations, any path within the resulting AAG that does not lead to a goal is purged (pruned) from the AAG. As described in further detail herein, the resource-efficient AAG generation of the present disclosure provides multiple technical advantages over traditional approaches, which can include a reduced burden on technical resources (e.g., memory, processing power), more rapid generation of AAGs, and AAGs that are less complex and more useful for cyber-security analysis.

As described herein, the resource-efficient AAG generation of the present disclosure can be realized within an agile security platform that considers attack complexity within an interconnected cyber infrastructure with a variety of attack paths to comprehensively address real attack scenarios. In general, the agile security platform provides a cyber-threat analysis framework based on characterizing adversarial behavior in a multi-stage cyber-attack process. As described in further detail herein, how a threat proceeds within a network is investigated using an AAG and all possible attack stages are identified. In some implementations, each stage can be associated with network attributes. Using a holistic view of threat exposure provided by AAGs, attack techniques and tactics are incorporated into stepping stones found in AAGs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes the resource-efficient AAG generation of the present disclosure based on the network information.

In some examples, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMIDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
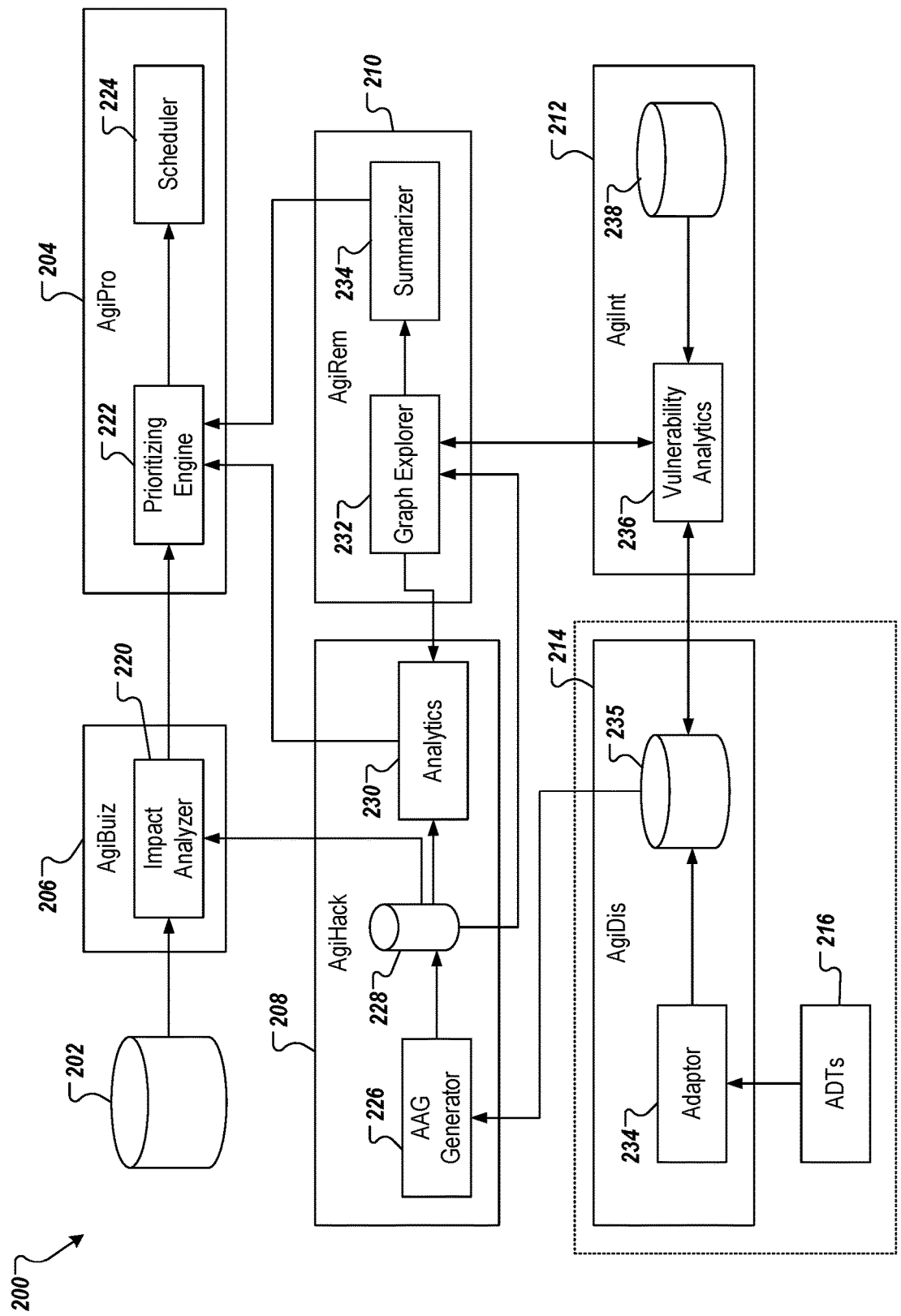
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using the resource-efficient AAG generation of the present disclosure, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

As introduced above, cyber-threat analysis for a computer network leverages one or more AAGs. In some examples, an AAG is generated by a cyber-security platform, such as the AgiSec platform described herein. In mathematical terms, an AAG can be described as a directed graph modeled as G (V, E) with a set of nodes $V=\{v_1, \ldots, v_n\}$ and a set of edges $E=\{e_1, \ldots, e_m\}$ connecting nodes together, where $|V|=n$ and $|E|=m$.

Figure 3:
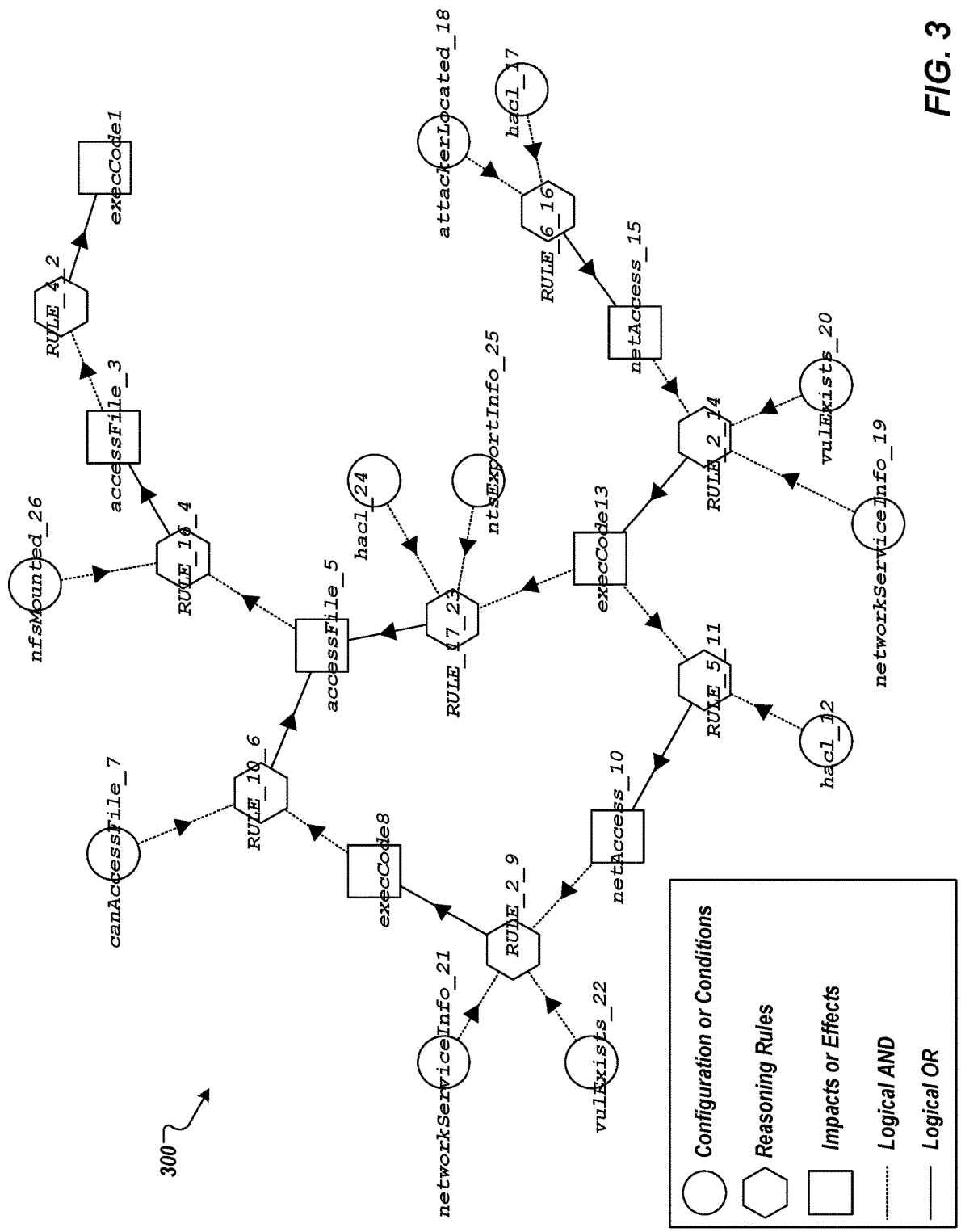
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of network and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets C, I, R, respectively. Accordingly, $C=\{c_j|c_j\in V, \forall c_j \text{ is a configuration}\}$, $I=\{i_j|i_j\in V, \forall i_j \text{ is an impact}\}$, and $R=\{r_j|r_j\in V, \forall r_j \text{ is a rule}\}$. Consequently, the combination of these sets accounts for all vertices of the graph G (i.e., $V=\{C, I, R\}$).

AAGs generated in accordance with implementations of the present disclosure can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes.

As described herein, implementations of the present disclosure provide resource-efficient generation of AAGs. More particularly, implementations of the present disclosure enable an AAG to be generated, which is maximally accurate in representation of an underlying computer network, but is minimal in representation of the computer network with respect to the number of vertices and edges. Further, AAGs generated in accordance with implementations of the present disclosure, minimize a number of loops, if any are required, in representing computer networks.

As introduced above, and as represented by way of example in FIG. 3, an AAG includes multiple types of nodes, which include configurations, rules, and impacts. In some examples, a configuration represents facts about the existing computer configuration (e.g., a certain user exists on the computer, the computer has a certain vulnerability). In some examples, a rule represents a combination of all incoming configurations and impacts. Because configurations are facts, there is no requirement that they be satisfied. However, all incoming impacts would need to be satisfied, meaning that an adversary has to achieve the impacts to be successful in lateral movement. In some examples, an impact represents the actual action on a component that the adversary can achieve. In order to achieve such an action, the adversary has to comply with all of the requirements of the incoming rule node, as well as edges (e.g., hops/lateral movements of the adversary in the computer network).

In accordance with implementations of the present disclosure, and as described in further detail herein, a rule engine processes information gathered by one or more discovery programs on a computer network to create logic rules. The logic rules are generated based on vulnerabilities and computer configurations present within the computer network, which are transferred to facts. In some examples, the logic rules are provided in a simulated Prolog language. In some implementations, the logic rules are represented within a resulting AAG that represents all possible strategies invokable by an adversary within the computer network.

In some implementations, the resource-efficient generation of AAGs of the present disclosure processes data collected on configurations (facts) on each component in a computer network, data collected on existing vulnerabilities on the components, and logic rules, and processes the logic rules using a rule engine to generate an AAG. For example, a set of facts is provided, which includes configurations and vulnerabilities determined for a computer network. By way of non-limiting example, and as described above, the AgiDis service 214 of the AgiSec platform of FIG. 2 discovers assets, their connectivity, and their specifications and stores this information in the asset/vulnerabilities knowledge base 235. This information includes facts of the computer network. Example facts include, without limitation configurations of components (e.g., user accounts associated with respective components, services executed by respective components, known vulnerabilities of components and/or services), users established within the computer network, and groups of users (e.g., a group indicating a role that users can be assigned to, such as an administrator role). Example facts can be provided as:

groupContainsDirect('Domain Users', 'UserA') serviceAccess('host', 'Local System', 'Domain Users')

By way of non-limiting example, and as also described herein, the AgiInt service 212 discovers vulnerabilities in the computer network based on data provided from the AgiDis service 214. An example vulnerability can include that a particular operating system version enables a user with certain privileges (role) to modify a service executable. Consequently, if an adversary obtains credentials to pose as the user with the certain privileges and is able to laterally move to the machine with the particular operating system, the adversary could execute malicious code.

In some implementations, the set of facts are provided as respective tables stored within a database (e.g., the assets/vulnerabilities knowledge base 235 of FIG. 2). In each table, values of facts are stored and are indexed with an index. For example, a first table can include a user table that stores users established within the computer network, and a second table can include a component table that stores component identifiers for machines within the computer network. Example tables can include:

TABLE 1

User Table
Domain Users

| Index | Value |
|---|---|
| 11 | User1 |
| 12 | User2 |
| 13 | User3 |
| ... | ... |

TABLE 2

Asset Table
Asset

| Index | Value |
|---|---|
| 21 | host1 |
| 22 | host2 |
| 23 | host3 |
| ... | ... |

It is appreciated that the example tables above are relatively simplistic and are provided for purposes of illustration. For example, an as noted above, each value within a table is associated with a respective index. Example indexes of Table 1 include the integers 11, 12, 13, where the first value 1 indicates the table and the second value indicates a row in the table. For example, User2 is indexed with the integer 12 indicating table 1, row 2. Example indexes of Table 2 include the integers 21, 22, 23, where the first value 2 indicates the table and the second value indicates a row in the table. For example, host3 is indexed with the integer 23 indicating table 2, row 3. Accordingly, and as illustrated using the examples of Table 1 and Table 2, each fact is uniquely identifiable by its assigned index.

In accordance with implementations of the present disclosure, a set of rules that describe how an adversary would perform lateral movements in a computer network are provided. For example, a rule can state that, if a computer has a user account in group A and has a known security vulnerability CVE-ABC in service X, then the computer may be compromised. Continuing with this example, it can be assumed that, among the data collected from the computer network (e.g., included in the fact file), there is a computer that meets the criteria. Consequently, a resulting AAG will contain nodes with the facts (user account, service vulnerability) linked to a node describing the impact of the rule (e.g., code execution on the computer by the user).

For purposes of illustration, example rules can be provided as:

```
interaction_rule(
    (execCode(User, Host) :-
        serviceAccess(Host, User, Group),
        execCode(User2, Host),
        groupContains(Group, User2),
        User \== User2
    ),
    rule_desc('Local privilege escalation via group membership
by changing executable path of a service', 1.0)).
interaction_rule(
    (groupContains(Group, Principal) :-
        groupContainsDirect(Group, Principal)
    ) ,
    rule_desc('Direct group membership', 0.0)).
```

Here, for example, an impact of exeCode ('host2', 'UserA') could be resolved based on the respective rule and facts. The rule provides that, once there is a user (adversary), who has hijacked a machine (UserA), and the user is in the group that can modify a Windows service executable that runs under a more powerful account, then the user can execute code (e.g., malicious code) under this (more powerful, having more permissions) account.

The above example rules are provided in Prolog, which can be described as a logical programming language that can be applied to solve any generic logical problem. In Prolog, and as provided in the above examples, :—is read as an "if" to indicate instances when the preceding clause would be true (i.e., grounded). For example, (execCode (User, Host) is true, if (: —) serviceAccess (Host, User, Group), execCode (User2, Host), and groupContains (Group, User2). In this example, serviceAccess (Host, User, Group), execCode (User2, Host), and groupContains (Group, User2) can be considered arguments (facts or impacts) that are used to evaluate whether the clause (execCode (User, Host) is true.

Traditional methods of generating AAGs use existing Prolog implementations to create an AAG by applying rules to the data collected from the computer network. However, traditional generation of AAGs can rely on Prolog as a rule engine. For example, MulVal relies on XSB, which can be described as a dialect of Prolog. MulVal (from Multi-host, Multi-stage Vulnerability Analysis Language) can be described as a logic-based network security analyzer that is used to generate AAGs. MulVal uses backward chaining for rule resolution (in terms of logical inference, to "ground" the rules). To ground means to find facts that make the rule true. In the example rule above, the code execution is grounded. Backward chaining can be implemented as tree traversal or as recursion (as a special case of tree traversal). The implementation can be effective, if the rate of the grounded rules (rules that come "true") for the given query is negligible compared to the overall search space (all "true" rules).

In the case of generating an AAG, when analyzing all possible lateral movements towards several highly valued target computers, it is often the case that the resulting tree may constitute a significant portion of the graph. That is, the interest lies in all possible ways an adversary may exploit any available resource to reach the target.

In contrast to approaches, such as MulVal, implementations of the present disclosure use only a portion of Prolog for describing clauses. That is, rules that are to be evaluated for resource-efficient AAG generation are provided in Prolog, and can be processed to build a vocabulary, as described in further detail herein. Also in contrast to approaches, such as MulVal, implementations of the present disclosure use forward chaining, which is computationally more efficient than backward chaining for the specific use case of AAG generation. Backward chaining starts with the target clause (in the case of AAG—the goal) and proceeds till all the clauses that satisfy the conditions defined by the rules are found. This is usually implemented as graph traversal. In the case of AAG, the traversal starts with the goals and continues all the way down to the input facts. The approach is efficient in the case when the algorithm traverses a negligible part (e.g., less than 0.5% for 1000 machine network as our experiments show) of the overall graph or if the graph is small. Here graph represents all the possible grounded impacts provided a given set of facts and rules.

In the case when a significant part of the graph is processed (e.g., 5-15% as is the case in most settings for AAG), forward chaining is much more efficient. Forward chaining can be described as a computer-executable forward reasoning process (e.g., executed by a rule engine) that takes data (e.g., facts of the computer network) and uses the rules to extract additional data until a goal is achieved. For example, a rule engine can use forward chaining to search rules until a rule is found that has a true antecedent (e.g., if clause). When such a rule is found, the rule engine infers the consequent (e.g., then clause), resulting in extraction of additional data. In some examples, the rule engine iterates through this process until the goal(s) is/are achieved. In some implementations, the rule engine of the present disclosure executes forward chaining as a series of hash joins for each rule.

The output of forward chaining and backward chaining is exactly the same. The difference is in implementation (i.e., how the inference is performed). The backward chaining uses tree traversal. It starts with the rules that result in "goal" impacts and proceeds all the way down to the facts. Usually this is done using so called dynamic programming, a technique that assumes that tables of intermediate results are held in memory, and by doing so the algorithm avoids repetitive calculations of the same impact values. Accordingly, the logical inference is done one-by-one for each impact and each fact. If the graph being traversed to satisfy the logic inference task is negligible compared to the graph representing all possible inferences, then this is very efficient. However, if in order to satisfy the inference query the algorithm eventually will be required to traverse a significant proportion of the graph, this misses out on a much more efficient approach. The approach is hash joins as described herein.

More particularly, forward chaining of the present disclosure is done by hash joins, a technique that is widely used in relational databases. For each rule, all the input clauses are joined together by the values of overlapping arguments (e.g., in the example above, both serviceAccess and exeCode have Host argument in common, the table after joining the two clauses will have User2 and Group in common with clause groupContains). The joining is performed based on equality. Continuing with the example above, it can be assumed that there exist a fact serviceAccess ('h1', ' u1', 'g1') and an impact execCode ('u2', 'h1'). Then the first step in resolving the rule is creation of intermediate table (later referred to as GST) containing a row of values ('h1', 'u1', 'g1', 'u2'). Next, it can be assumed there is an impact groupContains ('g1', 'u2'). The next step is joining the intermediate table with the groupContains table which results in a row of values ('h1', 'u1', 'g1', 'u2'). The grounding of a rule completes producing a new impact execCode ('u1', 'h1').

In some implementations, an argument vocabulary is provided. For example, in a pre-processing phase, a list is generated of every unique argument string that either fact clauses and/or rule clauses have. In some examples, the list is sorted and all of the arguments (facts) are replaced by their corresponding indexes in the list. For example, and as described above, each fact is uniquely identifiable by its assigned index within a table. The list is referred to herein as a vocabulary, which represents unique strings as numerical values (e.g., a unique username is identified by its index). By using the indexes rather than strings, numerous efficiencies can be achieved during the logical inference process.

In some implementations, the vocabulary is generated irrespective of the rules. All the facts are scanned for their arguments, and the argument values are then placed into a single ordered list. The following example input scenario can be considered, in which the scenario is run in the network under MS Active Directory TM. There is one user USER1, who has a working computer named USER1_PC, the user is a domain administrator, and the user logged in into the computer. All domain administrators have local administrative privileges on this computer. The same argument value may be repeated across multiple fact, but it will enter vocabulary only once, and will receive a single index value.

```
domainUser('USER1@MYCOMPANY.COM', 'MYCOMPANY.COM')
isComputer('USER1_PC.MYCOMPANY.COM', 'MYCOMPANY.COM')
domainGroup('ADMINISTRATORS@MYCOMPANY.COM',
    'MYCOMPANY.COM')
localGroup ('USER1_PC.MYCOMPANY.COM', 'ADMINISTRATORS',
    'ADMINISTRATORS@USER1_PC.MYCOMPANY.COM')
groupContainsDirect('ADMINISTRATORS@MYCOMPANY.COM',
    'USER1@MYCOMPANY.COM')
groupContainsDirect('ADMINISTRATORS@USER1_PC.MYCOMPANY.CO
    M' 'ADMINISTRATORS@MYCOMPANY.COM')
hasSession('USER1_PC.MYCOMPANY.COM',
    'USER1_PC.MYCOMPANY.COM')
```

The above example results in the below example vocabulary:

| Index | Argument Value |
|---|---|
| 0 | ADMINISTRATORS |
| 1 | ADMINISTRATORS@MYCOMPANY.COM |
| 2 | ADMINISTRATORS@USER1_PC.MYCOMPANY.COM |
| 3 | DOMAIN_CONTROLLER.MYCOMPANY.COM |
| 4 | MYCOMPANY.COM |
| 5 | USER1@MYCOMPANY.COM |
| 6 | USER1_PC.MYCOMPANY.COM |

In accordance with implementations of the present disclosure, hash joins are used in the logical inference process. However, the build phase of traditional hash joins is forgone and, instead of using hash values for respective facts, indexes are used in the probe phase. That is, and in accordance with implementations of the present disclosure, no hash values are generated, which obviates the need to store hash values. Hence, a reduced memory footprint is achieved, which also results in improved processing performance (e.g., speed), since memory allocations are expensive in terms of CPU cycles used. Memory footprint is a significant consideration when generating relatively large AAGs. For example, and for some cases (e.g., analyzing a computer network of few thousand computers), traditional approaches run out of memory and fail. Further, calculating hash values during joins is avoided, because the index value itself serves as the hash. Accordingly, processing performance is improved by avoiding hash calculations.

In accordance with implementations of the present disclosure, each rule in the set of rules is defined, such that the facts input to the rule are known beforehand. That is, the facts in the set of facts are immutable and do not change during the logical inference process. However, every time a rule is grounded (i.e., is found to be true) an impact is generated (e.g., as additional data). This impact may serve as an input to another rule, and so forth. In a fully functional Prolog implementation, facts and impacts are treated equally in the sense that both can be provided as input to a rule. Also, the number of impacts in an AAG can be much larger than that of the number of facts. That is, a set of facts applied to a set of rules results in a set of impacts, where the number of impacts in the set of impacts can be much larger than the number of facts in the set of facts.

In accordance with implementations of the present disclosure, the set of rules is divided into multiple sub-sets of rules. In some examples, a first sub-set of rules includes rules that only rely on facts as inputs. That is, none of the rules in the first sub-set of rules includes impacts as input. In some examples, the rules in the first sub-set of rules are each only grounded once and produce a set of impacts. In some examples, a second sub-set of rules includes rules that rely on one or more impacts as input or a combination of fact(s) and impact(s) as input. In some examples, rules that rely on a combination of fact(s) and impact(s) (mixed rules) are only run once. However, mixed rules cannot be fully grounded, because no impact has been resolved. In some examples, sets of impacts can be referred to in generations. For example, a set of impacts resulting from a rule in the first sub-set of rules is referred to as a first generation set of impacts. Each subsequent run of the rule grounding process produces sets of impacts of respective subsequent generations.

In some implementations, while performing join operations, a temporally in-memory data structure is provided to hold the results of intermediate join operations. These data structures are referred to herein as grounded set tables (GSTs). For example, and without limitation, if a rule has three (3) facts, all of the records of a first fact (fact 1) is copied to a first GST (GST 1), a join with a second fact (fact 2) will produce a second GST (GST 2), and a join with a third fact (fact 3) will produce a third GST (GST 3). The third GST is used to extract arguments of the generated impact type. For the mixed rules, the generated GSTs are kept in memory for processing once all of the impacts they depend on become available.

As introduced above, implementations of the present disclosure perform logical inferencing using hash joins to evaluate whether a clause is true (i.e., is grounded) and, if true, provide one or more impacts resulting therefrom. Traditional hash join includes a build phase and a probe phase. In the build phase, hash values are calculated and stored. However, and as described herein, implementations of the present disclosure use indexes of the facts for the probe phase, obviating calculation and storage of hash values.

In some examples, the number of arguments for the same clause may vary. For example, a clause "execCode (User, Host)" can be considered, where User and Host are each arguments (facts). In this example, one rule can rely on specific values of both arguments, while another rule only needs to join on User (e.g., username, such as, User1, User2, etc.). In some examples, facts and resolved impacts can each contain wild cards as arguments (e.g., one or more arguments match any value.

To address issues provided by the above examples, implementations of the present disclosure use multiple types of joins. Example types of joins include, without limitation, an all fields join, a pattern join, and a Cartesian join. In some examples, the all fields join is provided as a traditional (simple) hash join, absent calculation and storage of hash values for the facts. In some examples, a pattern join is an optimized join only on fields that are grounded on both sides of the join. The pattern join uses in-memory indexes from an impact repository. In some examples, a separate index (hash map) is created for every permutation of grounded records for the impact type. For example, if there are "execCode" with both User and Host, and Hosts, on which every user can perform code execution, then two indexes will be kept for the impact, a first index for both arguments (User, Host), and a second index for only the second argument (Host). In some examples, a Cartesian join is use in instances where a rule has a clause with arguments that are grounded as placeholders. Cartesian join can be described as a Cartesian product of two sets resulting in a set of ordered pairs. For example, a table can be created by taking the Cartesian product of a set of rows and a set of columns, where the cells of the table contain ordered pairs of the row values and column values.

In some implementations, if a cartesian join results in a number of nodes that exceeds a threshold number of nodes (e.g., the threshold is configurable), then a node is not created per set of grounded clauses (as done in regular rule resolution). Instead, implementations of the present disclosure connect all input facts to the resulting impact and define all the of the input arguments as placeholders. In real-life computer networks, a cartesian join affecting thousands of computers, user accounts, and/or other artifacts may result in millions of nodes. If this happens this usually indicates a serious breach at a specific location (or, more commonly, a specific pattern that runs throughout the organization). Unless the issue is resolved, further analysis of specific lateral movements is of low value (since this means an adversary may move from any location to any other location within the computer network). Implementations of the present disclosure use cartesian join abstraction in order to address such potential for security beaches and still present a meaningful AAG (i.e., an AAG that may reveal other issues as well).

In some implementations, an optimization is provided by only triggering rules, which depend on impacts that are resolved in a respective generation. That is, for example, if a rule relies on an impact that would have been generated in a previous generation, but was not, the rule is not evaluated.

In some implementations, a look-ahead mechanism is used in execution plans to minimize the memory footprint of intermediate results and decrease the amount of computation needed. The look-ahead mechanism can be described as a sub-procedure that attempts to foresee the effects of choosing a branching variable to evaluate one of its values in order to choose a variable to evaluate next and/or to determine an order of values to assign to the variable. In the context of the present disclosure, the look-ahead mechanism is used to identify and first run specific joins including joins that have more shared variables than other joins.

As introduced above, the rule engine iterates through the forward chaining process until the goal is achieved. In the context of the present disclosure, the goal can be defined as a given impact with specific arguments. For example, and without limitation, the goal can be to execute code on machine A within the computer network (e.g., an adversary laterally moving through the computer network to machine A and executing code there). In some implementations, whether the goal is reached is determined by a hash lookup.

In some examples, a separate table for each type of goal impact is held in memory. Once a set of impacts of given type is grounded, it is checked whether there is a goal table awaiting this type of impact (e.g., impacts of type "execCode"). If there is such a table a hash join mechanism identical to that used for logical inference is invoked. E.g. if execCode ('user1', 'host1'), execCode ('user1', 'host2') are grounded, and the goals are execCode (_, "host2"), execCode (_, "host3") the indexes of values "host1" and "host2" will be matched against the hashmap containing indexes of "host2" and "host3" resulting in positive for "host2" only. If the goal (impact) is reached, the goal is not used in a next generation. In some examples, whether a goal is to be used in a next generation can be configured. For some cases, for example, the goal computer may be a hub that includes the entire compute network. Consequently, if the goal is used as input for the next generation, the resulting AAG can be bloated with a high number of nodes and edges, which are irrelevant for analysis.

In some implementations, after grounding is complete, all nodes that do not lead to any goal are purged from the AAG. In some examples, a flood fill algorithm is used to purge nodes. The flood fill algorithm can be described as an algorithm that determines the area connected to a given node in a multi-dimensional array. In some examples, all nodes that represent goals reached are marked as "connected." The incoming edges are used to traverse all the graph down to the input facts. The outgoing edges are ignored. Each such node is marked as "connected." Thus, only nodes that eventually lead to targets are marked. Then all the nodes which are not in the connected set are purged, along with edges that have a node being purged on either side (incoming or outgoing).

In some implementations, not all nodes of the AAG are needed for certain tasks or analytical queries (e.g., measuring hackability of the AAG by calculating a graph value). For example, and in the case of calculating a graph value, configuration nodes only distort the calculation. The distortion results, because the hackability (graph value) calculation of the graph depends only on the pathways of potential attacks, and on their hardness. Since configuration nodes are not a part of the pathways, they distort the calculation of Eigenvector centrality for nodes, which is used in calculating the graph value.

Figure 4:
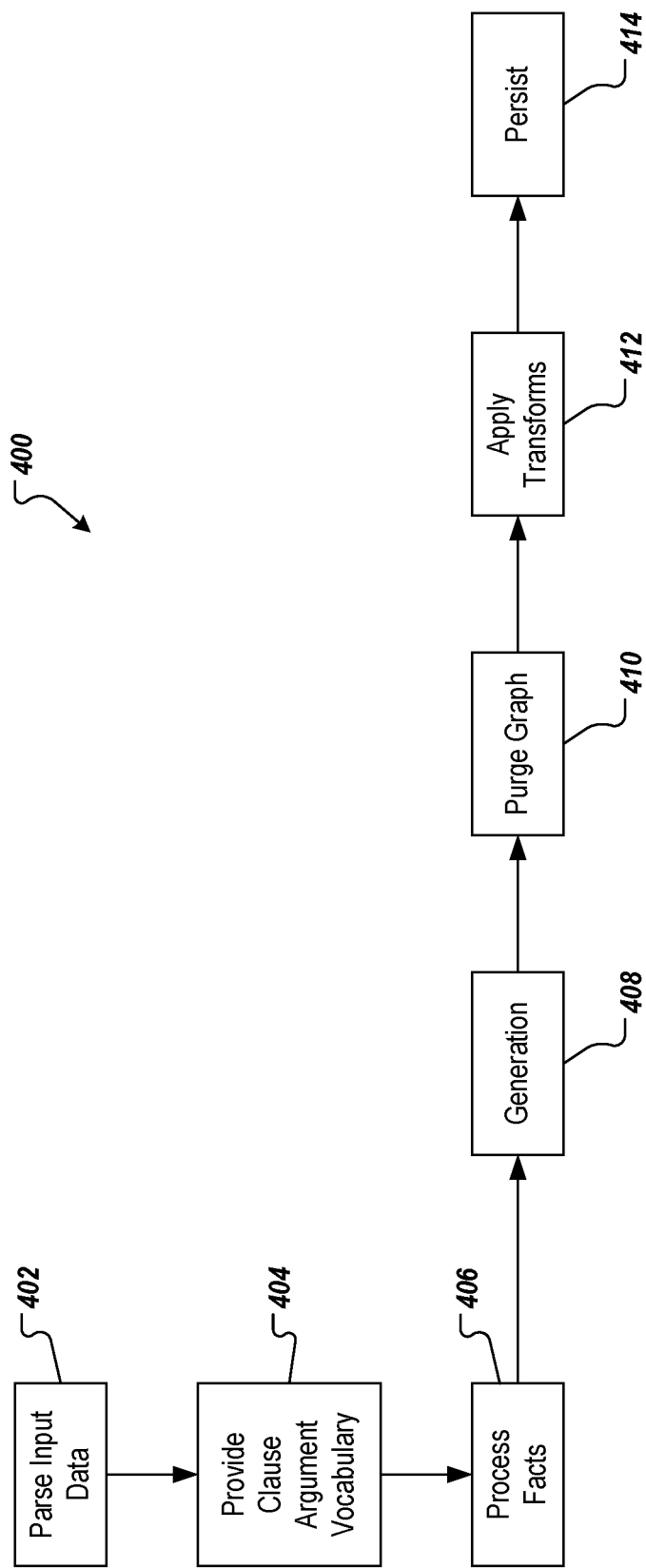
FIG. 4 depicts an example workflow for resource-efficient generation of AAGs in accordance with implementations of the present disclosure.

FIG. 4 depicts an example workflow 400 for resource-efficient generation of AAGs in accordance with implementations of the present disclosure. The example workflow 400 of FIG. 4 includes parsing input data 402, providing an argument vocabulary 404, processing facts 406, graph generation 408, graph purging 410, applying transforms 412, and persisting 414. In some examples, each of the activities represented in the example workflow 400 can be executed by one or more software modules that are provided as computer-executable code that is executed to provide functionality described herein.

In some examples, parsing input data 402 is performed by one or more parsers and includes processing input data to identify clauses and arguments from a set of rules. For example, and as described herein, each rule can be provided in Prolog. Using knowledge of the Prolog structure, clauses and respective arguments to evaluate clauses can be parsed from the rules. In some examples, providing an argument vocabulary 404 is performed by one or more vocabulary builders and includes processing facts in the set of facts. For example, and as described above, a list is generated of every unique argument string that either fact clauses and/or rule clauses have. In some examples, the list is sorted and all of the arguments (facts) are replaced within the list by their corresponding indexes. For example, and as described above, each fact is uniquely identifiable by its assigned index within a table. The list is referred to herein as a vocabulary, which represents unique strings as numerical values (e.g., a unique username is identified by its index).

In some examples, processing facts 406 is performed by one or more fact processors. In some examples, the facts are known before the logic inference process starts. The impacts are only known after the logic inference completes. This is so by definition, since the impacts are the outcome of logic inference process. This phenomenon is taken advantage of to boost performance. The rules that have only facts as their inputs (no impacts) are grounded first and are never visited again (since all their input is processed). The rules that have both facts and impacts as their input (which can be referred to as mixed rules) are partially grounded, and their corresponding GSTs grounded in facts only are kept in memory until the logical inference process completes. Accordingly, when a new impact that may serve as an input to a mixed rule is grounded, the mixed rule grounding is sped up because it is only performed in the part of impacts, all the input facts have already been processed and are stored in the rule's GST.

In some examples, graph generation 408 is performed by a rule engine (also referred to as an inference engine) and includes iterative generation of paths in a graph, as described herein. More particularly, and in accordance with implementations of the present disclosure, during multiple iterations rules (clauses) are evaluated by applying one or more facts, one or more impacts (determined from previous evaluation of one or more rules) to provide one or more impacts. Iterations are performed until all goals in a set of goals are achieved. This is described in further detail with reference to FIG. 5. In some examples, an output of the graph generation 408 is a data structure (e.g., a table) storing all rules that had been evaluated, arguments (facts, impacts) applied to each rule, and impact(s) output by each rule.

In some examples, graph purging 410 is performed by one or more graph processors and includes deleting paths from the data structure that do not lead to a goal (i.e., an impact identified as a goal). In some examples, a path can be defined as a chain of arguments and rules, the chain ending in at least one impact. If the at least one impact at the end of a chain is not a goal, the chain, and thus, the path, is removed from the data structure. The following example paths can be considered for purposes of illustration:

$$F_1 \rightarrow R_1 \rightarrow I_1 \rightarrow R_2 \rightarrow I_2 \quad \text{(Path 1)}$$

$$F_2 \rightarrow R_3 \rightarrow I_3 \rightarrow R_4 \rightarrow I_4 \quad \text{(Path 2)}$$

where F indicates one or more facts applied to a rule R resulting in one or more impacts I that can also be applied to a rule R. In this example, it can be determined that $I_2$ is a goal in the set of goals, and that $I_4$ is not a goal in the set of goals. Consequently, Path 2 can be deleted, while Path 1 remains.

In some examples, applying transforms 412 is performed by one or more transformers. In some examples, a transformer includes elimination of excessive loops. For example, it can be assumed that account user1 is compromised and can be exploited to compromise account user2. If the only impact of compromising a user2 account is to exploit user1 then this conclusion bears no value, because no hacker will gain anything by doing so. This is a very common situation, for example, when a local administrative account can be used to compromise default administrator on the same machine. Although one transformer is used in this example, this architectural approach may be used to apply a range of transformations such as merging the attack graph with external data sources (e.g., industry-specific attack statistics/history) to create enriched knowledge graph, or to calculate delta between current and previous AAG, and by doing so to enable temporal analytics, and other. This is an important extensibility point of the invention.

In some examples, persisting 414 includes storing the AAG to computer-readable memory.

Figure 5:
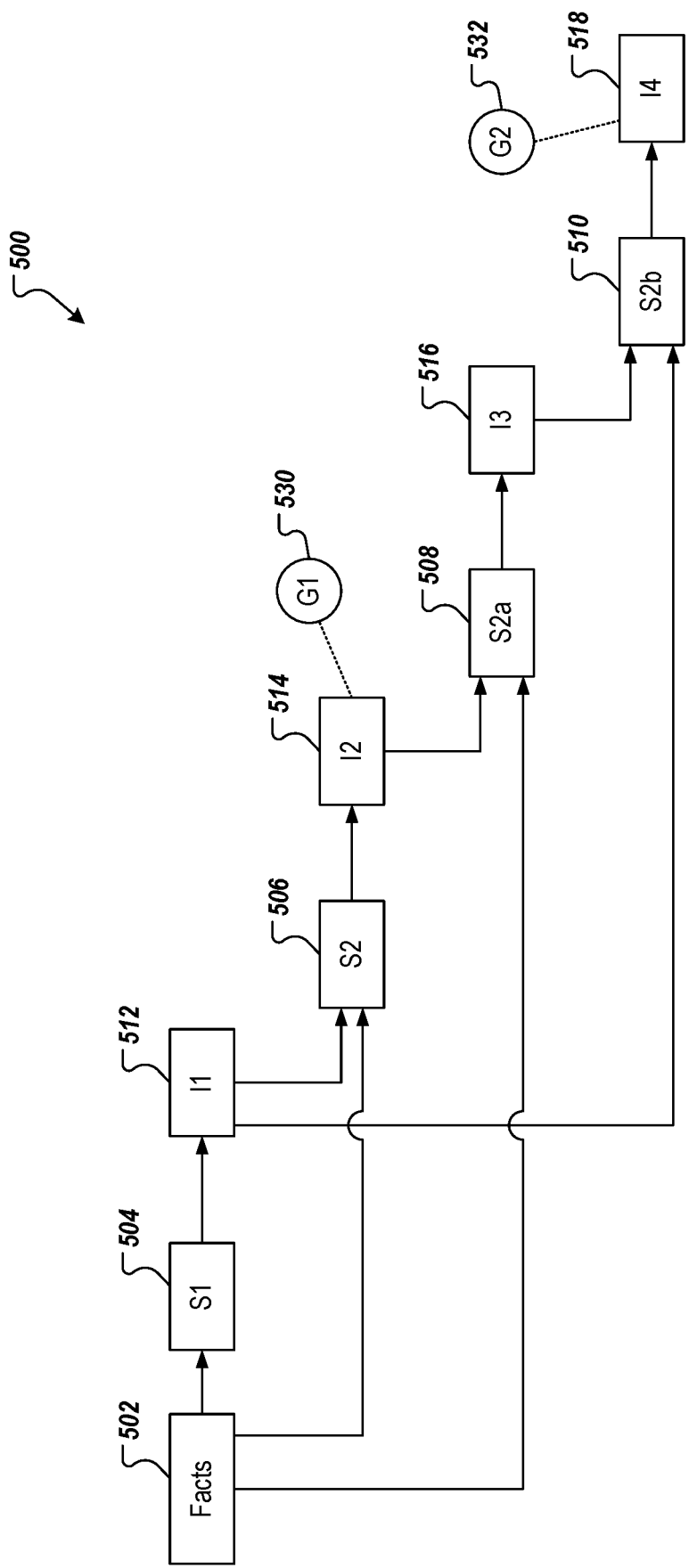
FIG. 5 is a graphical representation of at least a portion of an example AAG generation in accordance with implementations of the present disclosure.

FIG. 5 is a graphical representation of at least a portion of an example AAG generation 500 in accordance with implementations of the present disclosure. In the example of FIG. 5, a set of facts 502 is provided, which includes all facts determined for an underlying computer network (i.e., the computer network, for which an AAG is to be generated). As discussed above, the set of facts 502 is immutable in that the set of facts 502 does not change during generation of the AAG. As also discussed above, values for each fact are stored in respective tables and are indexed within the tables.

In the example of FIG. 5, a first sub-set of rules (S1) 504 and a second sub-set of rules (S2) 506 are provided. As discussed above, the first sub-set of rules 504 includes only rules that have facts as input. In some examples, the first sub-set of rules 504 only includes rules, for which one or more facts required as input are included in the set of facts 502. For example, a super-set of rules can include all rules that may be relevant to the underlying computer network, and at least one rule can depend on a particular fact that is absent from the set of facts 502. Consequently, the at least one rule is not included in the first sub-set of rules 504. As also discussed above, the second sub-set of rules 506 includes rules that have a combination of facts and impacts, and/or only impacts as input. In the example of FIG. 5, a first sub-subset of rules (S2a) 508 and a second sub-subset of rules (S2b) 510 are depicted, and each is explained in further detail below.

In the example of FIG. 5, in a first iteration of AAG generation, one or more facts of the set of facts 502 are applied as arguments to at least one rule in the first sub-set of rules 504, which results in a first set of impacts 512. In some examples, each impact in the first set of impacts 512 results from at least one rule of the first sub-set of rules 504 that is grounded (i.e., held to be true) based on one or more facts in the set of facts 502. In some examples, the first set of impacts 512 can be referred to as first generation impacts.

In some examples, less than all rules in a sub-set of rules is grounded based on the one or more facts. That is, not all rules need result in an impact. In some examples, a rule can result in an impact (i.e., is grounded) based on a first sub-set of facts, but the same rule does not result in an impact (i.e., is not grounded) based on a second sub-set of facts. In some examples, a rule can result in an impact based on a first sub-set of facts and can result in the impact based on the second set of facts. To illustrate the above discussion, the following examples can be considered:

$$F_1 \rightarrow R_1 \rightarrow I_1$$

$$F_2 \rightarrow R_1 \rightarrow \text{null}$$

$$F_3 \rightarrow R_1 \rightarrow I_1$$

$$F_4 \rightarrow R_2 \rightarrow \text{null}$$

where F indicates sub-sets of facts (arguments) applied to rules R to provide an impact I. In this example, a sub-set of rules (e.g., the first sub-set of rules 504) includes rules $R_1$ and $R_2$, but only $R_1$ results in an impact (e.g., $I_1$). In this example, $R_1$ results in the impact in view of a first sub-set of facts $F_1$ and a third sub-set of facts $F_3$, but does not result in an impact in view of a second sub-set of facts $F_2$.

In the example of FIG. 5, in a second iteration of AAG generation, one or more facts of the set of facts 502 and one or more impacts of the first set of impacts 512 are applied as arguments to at least one rule in the second sub-set of rules 506, which results in a second set of impacts 514. That is, a combination of facts and impacts is provided as input to at least one rule in the second sub-set of rules 506. In some examples, the second set of impacts 514 can be referred to as second generation impacts. As noted above with respect to the first iteration, in some examples, less than all rules in a sub-set of rules is grounded based on the one or more facts, a rule can result in an impact (i.e., is grounded) based on a first sub-set of facts, but the same rule does not result in an impact (i.e., is not grounded) based on a second sub-set of facts, and/or a rule can result in an impact based on a first sub-set of facts and can result in the impact based on the second sub-set of facts.

In the example of FIG. 5, in a third iteration of AAG generation, one or more facts of the set of facts 502, one or more impacts of the first set of impacts 512, and one or more impacts of the second set of impacts 514 are applied as arguments to at least one rule in the first sub-subset of rules 508 to provide a third set of impacts 516. In some examples, the first sub-subset of rules 508 includes rules of the second sub-set of rules 506, which were not evaluated in the second iteration, because the impacts provided as input were not included in the first set of impacts 512. As noted above with respect to the first iteration and the second iteration, in some examples, less than all rules in a sub-set of rules is grounded based on the one or more facts, a rule can result in an impact (i.e., is grounded) based on a first sub-set of facts, but the same rule does not result in an impact (i.e., is not grounded) based on a second sub-set of facts, and/or a rule can result in an impact based on a first sub-set of facts and can result in the impact based on the second sub-set of facts.

In the example of FIG. 5, in a fourth iteration of AAG generation, one or more impacts of the first set of impacts 512, one or more impacts of the second set of impacts 514, and one or more impacts of the third set of impacts 516 are applied as arguments to at least one rule in the second sub-subset of rules 510 to provide a fourth set of impacts 468. In some examples, the second sub-subset of rules 510 includes rules of the second sub-set of rules 506, which were not evaluated in either the second iteration or the third iteration, because the impacts provided as input were not included in the first set of impacts 512 or the second set of impacts 514. As noted above with respect to the first iteration, the second iteration, and the third iteration, in some examples, less than all rules in a sub-set of rules is grounded based on the one or more facts, a rule can result in an impact (i.e., is grounded) based on a first sub-set of facts, but the same rule does not result in an impact (i.e., is not grounded) based on a second sub-set of facts, and/or a rule can result in an impact based on a first sub-set of facts and can result in the impact based on the second sub-set of facts.

In some implementations, at each iteration of AAG generation, all impacts that are resolved (i.e., that result from a rule being grounded) are stored in an impact repository along with respective indexes. For example, and with reference to FIG. 5, impacts in the first set of impacts 512 are stored in the impact repository at the end of the first iteration, impacts in the second set of impacts 514 are stored in the impact repository at the end of the second iteration, impacts in the third set of impacts 516 are stored in the impact repository at the end of the third iteration, and impacts in the fourth set of impacts 518 are stored in the impact repository at the end of the fourth iteration.

In some implementations, a list of pending rules is maintained during AAG generation. In some examples, a pending rule is a rule that depends on at least one impact that has not been resolved in an earlier iteration and, therefore, cannot be grounded. For example, and with reference to FIG. 5, rules in the first sub-subset of rules 508 include rules that depend on impacts that were not yet resolved and included in the first set of impacts 512, and rules in the second sub-subset of rules 510 include rules that depend on impacts that were not yet resolved and included in the first set of impacts 512 or the second set of impacts 514. In some examples, pending rules are stored along with their corresponding GST.

In some implementations, once a rule is grounded, the AAG is updated immediately. That is, the rule, its input(s), and its resulting impact are stored to a GST, which is maintained in memory until AAG generations completes. Upon completion of AAG generation, each GST is processed to provide nodes and edges for graphical representation of the AAG.

In some implementations, iterations of AAG generation are performed until each goal in a set of goals is achieved. Each goal in the set of goals is an impact that could result from a rule, if the rule is grounded based on facts and/or impacts. For example, a goal can be considered a so-called "crown jewel" that, if achieved, could result in significant consequences to the computer network. An example goal can include an impact of access to the credentials of a user having a particular user role (e.g., administrator) within the computer network. Another example goal can include an impact that would enable execution of code (malicious code) on a particular machine within the computer network.

To illustrate this, and in the example of FIG. 5, a set of goals can include a first goal (G1) and a second goal (G2). During generation of the AAG, the first goal (G1) is achieved as an impact 530 included in the second set of impacts 514. However, because the second goal (G2) had not been achieved to this point (after the second iteration), the generation process continues to the third iteration, and the fourth iteration (because the second goal (G2) is also not achieved after the third iteration). In the example of FIG. 5, the second goal (G2) is achieved as an impact 532 included in the fourth set of impacts 518. Consequently, evaluation of the rules is complete, and no further iterations are executed.

In some implementations, if a goal is achieved, the goal is not used as an impact input to a rule in any subsequent iteration. For example, and with continued reference to FIG. 5, the first goal (G1) is not provided as input to any rule in either the first sub-subset of rules 508 or the second sub-subset of rules 510. For example, and prior to consideration of each of the first sub-subset of rules 508 or the second sub-subset of rules 510, it can be determined that the first goal (G1) is an input to a rule. Consequently, the rule can be excluded from each of first sub-subset of rules 508 and the second sub-subset of rules 510. By excluding goals, and thus the rules that depend from goals, from further processing, loops within the resulting AAG are avoided. While some loops might result from non-goal impacts, the resulting AAG will at least be absent any loops that could have resulted, if a goal had been used as an input to a subsequent rule. In this manner, a number of loops present in an AAG is minimized.

Figure 6:
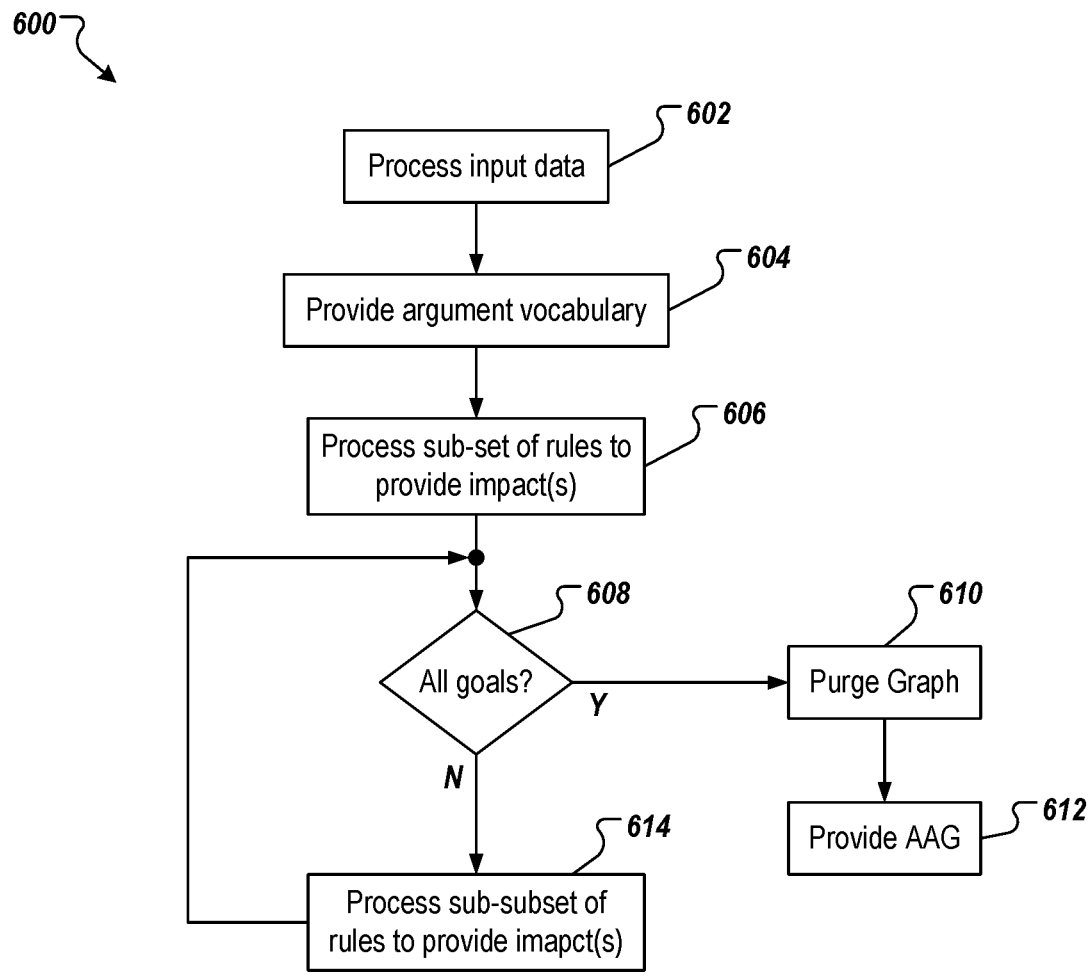
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices.

Input data is processed (602). For example, and as described above, input data can include data representative of a computer network (e.g., assets, users, services, operating systems) that is stored in a database. An argument vocabulary is provided (604). For example, and as described herein, the vocabulary is provided as a list of every unique argument string that either fact clauses and/or rule clauses have, where the vocabulary represents unique strings as numerical values (e.g., a unique username is identified by its index).

A sub-set of rules is processed (606). For example, and as described above with reference to FIG. 5, in a first iteration, the first sub-set of rules 504, which includes only rules that have facts as input, is processed. In some examples, the first sub-set of rules 504 only includes rules, for which one or more facts required as input are included in the set of facts 502. It is determined whether all goals in a set of goals is achieved (608). For example, it can be determined whether the first set of impacts 512 accounts for any and/or all goals in the set of goals. It can theoretically occur (e.g., in rare circumstances) that all goals are met after a first iteration. If all goals in the set of goals are achieved, the graph is purged (610) and the AAG is provided (612). That is, and as described above, paths of the AAG that do not result in a goal are removed, nodes/edges are provided, and the AAG is persisted to memory.

If all goals in the set of goals are not achieved, a sub-subset of rules is processed (614) and the example process 600 loops back to determine whether all goals have been achieved. For example, and as described above with reference to FIG. 5, after the first iteration, it is determined that no goals have been achieved, resulting in subsequent iterations, ultimately to the fourth iteration, which results in all goals being achieved.

Implementations of the present disclosure achieve one or more example advantages. Examples advantages include, without limitation, a reduced burden on technical resources (e.g., memory, processing powers (CPU)) when generating AAGs and more rapid generation of AAGs as compared to traditional approaches. These advantages are achieved through, for example, one or more of forward chaining, using indexes to represent facts in hash joins instead of hash values, and minimizing loops, each of which is described in detail herein.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating an analytical attack graph (AAG) representative of potential lateral movement within a computer network, the method being executed by one or more processors and comprising:
evaluating a first sub-set of rules based on a first sub-set of facts to provide a first set of impacts, evaluating comprising applying one or more facts of the first sub-set of facts to each rule using a hash join operation to determine whether a rule results in an impact, indexes of arguments of facts being used in a probe phase of the hash join operation;
evaluating a second sub-set of rules at least partially based on one or more impacts of the first set of impacts to provide a second set of impacts;
determining whether each goal in a set of goals has been achieved at least partially based on the first set of impacts and the second set of impacts, each goal being provided as an impact;
in response to determining that each goal in the set of goals has been achieved, removing one or more paths of the AAG, each of the one or more paths resulting in an impact that is not a goal in the set of goals; and
storing the AAG to computer-readable memory.

2. The method of claim 1, wherein each index is provided as an integer that uniquely represents at least one argument of a respective fact.

3. The method of claim 1, further comprising evaluating a third sub-set of rules at least partially based on one or more impacts of the second set of impacts to provide a third set of impacts.

4. The method of claim 3, wherein the one or more impacts of the second set of impacts is absent an impact that is determined to be a goal in the set of goals.

5. The method of claim 3, wherein evaluating the third sub-set of rules is executed in response to determining that each goal in the set of goals has not been achieved based on the first set of impacts and the second set of impacts.

6. The method of claim 1, wherein each rule comprises a clause, each fact is provided as an argument to evaluate whether the clause is grounded, and at least one impact is provided as an argument to evaluate whether the clause is grounded.

7. The method of claim 1, wherein the first sub-set of rules only includes rules having facts as arguments.

8. The method of claim 1, wherein the second sub-set of rules includes rules having impacts as arguments.

9. A non-transitory computer-readable storage medium coupled to one or more processors and having instructions stored thereon which, when executed by the one or more processors, cause the one or more processors to perform operations for generating an analytical attack graph (AAG) representative of potential lateral movement within a computer network, the operations comprising:
evaluating a first sub-set of rules based on a first sub-set of facts to provide a first set of impacts, evaluating comprising applying one or more facts of the first sub-set of facts to each rule using a hash join operation to determine whether a rule results in an impact, indexes of arguments of facts being used in a probe phase of the hash join operation;
evaluating a second sub-set of rules at least partially based on one or more impacts of the first set of impacts to provide a second set of impacts;
determining whether each goal in a set of goals has been achieved at least partially based on the first set of impacts and the second set of impacts, each goal being provided as an impact;
in response to determining that each goal in the set of goals has been achieved, removing one or more paths of the AAG, each of the one or more paths resulting in an impact that is not a goal in the set of goals; and
storing the AAG to computer-readable memory.

10. The computer-readable storage medium of claim 9, wherein each index is provided as an integer that uniquely represents at least one argument of a respective fact.

11. The computer-readable storage medium of claim 9, wherein operations further comprise evaluating a third sub-set of rules at least partially based on one or more impacts of the second set of impacts to provide a third set of impacts.

12. The computer-readable storage medium of claim 11, wherein the one or more impacts of the second set of impacts is absent an impact that is determined to be a goal in the set of goals.

13. The computer-readable storage medium of claim 11, wherein evaluating the third sub-set of rules is executed in response to determining that each goal in the set of goals has not been achieved based on the first set of impacts and the second set of impacts.

14. The computer-readable storage medium of claim 9, wherein each rule comprises a clause, each fact is provided as an argument to evaluate whether the clause is grounded, and at least one impact is provided as an argument to evaluate whether the clause is grounded.

15. The computer-readable storage medium of claim 9, wherein the first sub-set of rules only includes rules having facts as arguments.

16. The computer-readable storage medium of claim 9, wherein the second sub-set of rules includes rules having impacts as arguments.

17. A system, comprising:
one or more computers; and
a computer-readable storage device coupled to the computing device and having instructions stored thereon which, when executed by the computing device, cause the computing device to perform operations for generating an analytical attack graph (AAG) representative of potential lateral movement within a computer network, the operations comprising:

evaluating a first sub-set of rules based on a first sub-set of facts to provide a first set of impacts, evaluating comprising applying one or more facts of the first sub-set of facts to each rule using a hash join operation to determine whether a rule results in an impact, indexes of arguments of facts being used in a probe phase of the hash join operation;

evaluating a second sub-set of rules at least partially based on one or more impacts of the first set of impacts to provide a second set of impacts;

determining whether each goal in a set of goals has been achieved at least partially based on the first set of impacts and the second set of impacts, each goal being provided as an impact;

in response to determining that each goal in the set of goals has been achieved, removing one or more paths of the AAG, each of the one or more paths resulting in an impact that is not a goal in the set of goals; and storing the AAG to computer-readable memory.

18. The system of claim 17, wherein each index is provided as an integer that uniquely represents at least one argument of a respective fact.

19. The system of claim 17, wherein operations further comprise evaluating a third sub-set of rules at least partially based on one or more impacts of the second set of impacts to provide a third set of impacts.

20. The system of claim 19, wherein the one or more impacts of the second set of impacts is absent an impact that is determined to be a goal in the set of goals.

21. The system of claim 19, wherein evaluating the third sub-set of rules is executed in response to determining that each goal in the set of goals has not been achieved based on the first set of impacts and the second set of impacts.

22. The system of claim 17, wherein each rule comprises a clause, each fact is provided as an argument to evaluate whether the clause is grounded, and at least one impact is provided as an argument to evaluate whether the clause is grounded.

23. The system of claim 17, wherein the first sub-set of rules only includes rules having facts as arguments.

24. The system of claim 17, wherein the second sub-set of rules includes rules having impacts as arguments.

* * * * *